United States Patent [19]
DiFrancesco et al.
[11] E Patent Number: Re. 32,422
[45] Reissued Date of Patent: May 19, 1987

[54] METHOD AND APPARATUS FOR PRODUCING DUPLEX COPIES

[75] Inventors: Alphonse B. DiFrancesco, Penfield; Charles T. Hage, Rochester, both of N.Y.

[73] Assignee: Eastman Kodak Company, Rochester, N.Y.

[21] Appl. No.: 84,333

[22] Filed: Oct. 12, 1979

Related U.S. Patent Documents

Reissue of:
[64] Patent No.: 4,095,979
Issued: Jun. 20, 1978
Appl. No.: 768,665
Filed: Feb. 14, 1977

[51] Int. Cl.[4] ..... G03G 13/16
[52] U.S. Cl. ..... 430/126; 427/14.1; 355/3 R; 355/16; 355/26
[58] Field of Search ..... 430/126; 355/3 TR, 3 SH, 355/23, 24, 25, 26, 3 R

[56] References Cited

U.S. PATENT DOCUMENTS

| | | | |
|---|---|---|---|
| 3,536,398 | 10/1970 | Bhagat | 355/3 R |
| 3,578,859 | 5/1971 | Stillings | 271/51 |
| 3,671,118 | 6/1972 | Fantuzzo et al. | 355/26 X |
| 3,672,765 | 6/1972 | Altmann | 355/24 |
| 3,697,170 | 10/1972 | Bhagat et al. | 96/1.4 X |
| 3,833,911 | 9/1974 | Caldwell et al. | 355/24 X |
| 3,869,202 | 3/1975 | Dabata et al. | 355/3 R |
| 3,870,515 | 3/1975 | Kaupp | 430/126 |
| 3,947,270 | 3/1976 | North | 355/24 X |
| 4,035,073 | 7/1977 | Del Vecchio | 430/126 X |
| 4,205,220 | 5/1980 | O'Brien | 219/216 |

FOREIGN PATENT DOCUMENTS 7509333 10/1975 Netherlands

*Primary Examiner*—Roland E. Martin
*Attorney, Agent, or Firm*—William F. Noval

[57] ABSTRACT

Method and apparatus for producing duplex copies. First and second unfixed images are transferred to opposite sides of a copy sheet before fixing of either image to the copy sheet. The first and second unfixed images may be electroscopic images sequentially formed on a photoconductor by electrophotographic techniques. The first unfixed electroscopic image is transferred from the photoconductor to a first side of a copy sheet, the sheet is inverted while the first image thereon remains unfixed, the second unfixed electroscopic image is transferred to the second side of the copy sheet, the copy sheet with the first and second unfixed images thereon is then transported to a fixing station.

20 Claims, 5 Drawing Figures

METHOD AND APPARATUS FOR PRODUCING DUPLEX COPIES

Matter enclosed in heavy brackets [ ] appears in the original patent but forms no part of this reissue specification; matter printed in italics indicates the additions made by reissue.

CROSS-REFERENCE TO RELATED APPLICATIONS

Reference is made to U.S. patent application Ser. No. 768,666, entitled Apparatus For Producing Collated Copies In Page Sequential Order, filed in the name of A. B. DiFrancesco and C. T. Hage file on Feb. 14, 1977.

BACKGROUND OF THE INVENTION

1. Field of the Invention

This invention relates generally to duplex reproduction apparatus and more particularly to the transfer of unfixed first and second images to first and second sides of a copy sheet before fixing of either of the images to the copy sheet.

2. Description of the Prior Art

Several techniques are known for forming duplex images on a final support medium such as a web or copy sheet. One such technique requires the use of two photoconductors upon which first and second images are formed. The support medium is generally passed between the photoconductors and the first and second images are transferred to opposite sides of the support medium. U.S. Pat. Nos. 3,548,783; 3,536,398; 3,580,670; 3,694,073; and 3,775,102 are exemplary of such a technique. The latter four patents disclose transferring both images to the support medium before fixing of either image. This technique is disadvantageous in increased cost, complexity and machine size and decreased reliability necessitated by the use of two photoconductive systems and two optical systems.

Another technique similar to the above but involving the use of only one photoconductor, utilizes an intermediate image transfer member to receive the first image formed on the photoconductor before transfer to a final support medium. The intermediate transfer member may be either a drum or roller such as disclosed in U.S. Pat. Nos. 3,318,212; 3,687,541; 3,697,171; 3,702,482; 3,844,653; and 3,844,654 or a belt such as disclosed in U.S. Pat. Nos. 3,671,118 and 3,697,170. The latter technique also suffers the disadvantages of increased cost, complexity and machine size and decreased reliability necessitated by the use of additional components intermediate transfer to a final support medium. Additionally, there is the probability of degradation in image quality of images transferred to the intermediate transfer member which must then be transferred to the final support medium. Furthermore, in some instances as disclosed in U.S. Pat. No. 3,318,212 the developed images are tackified by use of solvent vapors which are potentially flammable and which require the use of a consumable fluid which must be replaced periodically.

A further duplexing technique utilized in certain commercial electrophotographic machines and disclosed in prior art patents utilizes a single photoconductor wherein first fixed images developed sequentially on the first sides of a plurality of copy sheets by the electrophotographic process are collated in an intermediate tray and then sequentially transported back through the electrophotographic process to develop second fixed images on the second sides of the copy sheets, thus producing duplex copy sheets. This technique is disclosed in U.S. Pat. Nos. 3,615,129; 3,630,607; 3,645,615; British Pat. No. 1,450,842; U.S. Pat. Nos. 3,833,911; 3,856,295; 3,866,904; 3,917,256; 3,917,257 and 3,963,345. The latter three U.S. Patents also disclose copy sheet inverters in the exit path of the respectively disclosed apparatus in order to accommodate stacking or collation of simplex or duplex copy sheets after fixation of images thereto. The latter "two pass" process has several disadvantages. Since the first sides of all the copy sheets are developed before development of the second sides of the copy sheets, a duplex copy is not available for proofreading until all of the first sides and one set of second sides have been developed. In addition, the relatively long paper paths required in passing a copy sheet through the entire electrophotographic process twice greatly increases the possibility of paper jams and other potential copy handling complications and also reduces copier efficiency and productivity. For example, when two or three page documents are copied, it may take longer for the first copy sheet to return for passage a second time through the copying process than for all of the other copy sheets to pass through the copying process the first time. Moreover, due to the long periods between forming and fixing images on the first and second sides of a copy sheet, the environmental conditions of image formation and the physical parameters of the copy sheet may change resulting in images of varying quality on opposite sides of a single sheet.

Still another duplex copying technique which may be considered especially relevant to the present invention involves fixing images to both sides of a copy sheet during a single pass through the disclosed electrophotographic processes. U.S. Pat. Nos. 3,506,347; 3,672,765; 3,869,202; and 3,947,270 disclose various embodiments of this technique. In the first patent just listed a first tackified image is formed on a transfer drum, the image is transferred to the first side of a copy sheet, the sheet is inverted whilst the first tackified image dries and becomes fixed on the copy sheet, a second tackified image is formed on the transfer drum and the copy sheet is fed back into contact with the drum to transfer the second image to the second side of the copy sheet which is then transported to an output tray. In the latter three patents electrophotographic apparatus is disclosed for making duplex copies wherein two images of an original are formed sequentially on an endless photoconductor, the images are developed and the first developed image is transferred to the first side of a copy sheet. The copy sheet is separated from the photoconductor, passed through a fuser to fuse or fix the first transferred image to the copy sheet which is then turned over and the opposite side of the copy sheet brought into contact with the second developed image on the photoconductor. The second image is then transferred to the second side of the copy sheet, the copy sheet separated from the photoconductor and the second image fused by means of a second fuser. The copy sheet is then transported to a copy receptacle. Although the apparatus disclosed in the latter three patents present a viable technique for forming duplex copy sheets, they do have certain disadvantages. Since the first image is fixed or fused before copy sheet turnaround, the use of two fusers is necessitated with attendant increase in cost, power and environmental heat. In addition, in the apparatus disclosed in U.S. Pat. No.

3,672,765 the photoconductor belt is fed around a roller spaced from the turnaround mechanism before transfer of the second image to a copy sheet. The resultant delay caused by copy sheet turnaround between transfer of the first and second images causes inefficient use of the photoconductive belt and slows down the photoconductive process. The use of solvent vapors to tackify the images as disclosed in U.S. Pat. No. 3,506,347 raises the problems of flammability and replenishing of the solvent. Moreover, use of a transfer drum unnecessarily complicates the electrophotographic process.

The prior art is also replete with disclosures of various configurations for turning around or inverting original or copy sheets or cards in various types of reproduction apparatus. Thus the inversion of duplex original document sheets for reproduction of both sides of the original in film reproduction apparatus is disclosed in U.S. Pat. Nos. 3,227,444; 3,408,140; 3,575,507 and in electrophotographic apparatus is disclosed in U.S. Pat. Nos. 3,561,865 and 3,675,999. Devices for inverting copy sheets or cards are also known in the art as exemplified in the disclosures of U.S. Pat. Nos. 2,901,246; 3,416,791; 3,523,687; and 3,848,868. Other sheet inverters are also disclosed in the prior art as exemplified by the disclosures of U.S. Pat. Nos. 2,904,334; 2,787,363; 3,008,707; 3,236,517; 3,389,906; 3,948,505 and French Pat. No. 2,219,013. None of the disclosures in the aforementioned patents disclose the concept of the present invention of forming unfixed images on opposite sides of a copy sheet before fixing of the images to the copy sheet.

SUMMARY OF THE INVENTION

According to the invention, method and apparatus are provided for producing duplex images on opposite sides of a support. First and second unfixed images are formed on an image transfer member and the first and second unfixed images are transferred to opposite sides of a support before fixing of either of said unfixed images to said support.

Preferably, the transfer member is a photoconductor, the first and second unfixed images formed on the photoconductor are electroscopic images formed by electrophotographic techniques and said images are transferred from the photoconductor to opposite sides of a copy sheet before fixing of either image thereto. According to an aspect of the invention the copy sheet is inverted after said first electroscopic image is transferred to a first side of a copy sheet but before fixing of said first image to said sheet.

According to another aspect of the invention a copy sheet having unfixed electroscopic images on both sides thereof is transported away from the photoconductor to a fixing station where both images are fixed to the copy sheet.

The invention, and its features and advantages, will be set forth and become more apparent in the detailed description of the preferred embodiment presented below.

BRIEF DESCRIPTION OF THE DRAWINGS

In the detailed description of the preferred embodiment of the invention presented below reference is made to the accompanying drawings, in which.

DESCRIPTION OF THE PREFERRED EMBODIMENT

Figure 1:
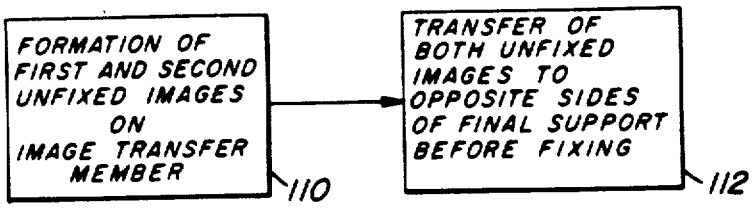
FIGS. 1–3 are block diagrams of embodiments according to the present invention.

Referring now to the drawings FIG. 1 is a block diagram of a preferred embodiment of the present invention. As depicted by box 110, first and second unfixed images are formed on an image transfer member. The unfixed images may be formed according to any of a number of techniques well known to those skilled in the art. The only requirement is that the images be transferable to a final support such as a copy sheet. For example, where the image transfer member is a photoconductor, the unfixed images may be formed by well known electrophotographic techniques wherein an electrostatic image of an object to be copied is formed on the photoconductor and the image is then developed by means of oppositely charged electroscopic particles which adhere to the photoconductor in the image areas to form a transferable unfixed electroscopic image which is a visual representation of the copied object. The electrostatic image of the copied object may be formed on the photoconductor by any of several known imaging techniques. Where the object to be copied, for instance, is a two sided original document, each side may be sequentially or simultaneously exposed by well known flash exposure techniques to produce sequential electrostatic images on the photoconductor. Two one sided originals may be similarly sequentially or simultaneously exposed to produce first and second electrostatic images thereon.

Other image inputs may take the form of microfilm having either sequential or side by side images, images formed on a cathode ray tube, images formed by LED arrays or fiber optic arrays and images raster scanned onto the photoconductor by flying spot scanner or laser beam scanner arrangements.

The image transfer member may also take the form of an insulating member where electrostatic images may be formed thereon by transfer from a photoconductor or by charge induction using well known facsimile recording techniques.

Transferable images may also be formed by magnetic printing techniques as disclosed on pages 216–219 of Electrophotography, 2nd Edition by R. M. Schaffert, 1975, John Wiley and Sons, New York. As therein disclosed, a magnetic image is formed on a ferromagnetic transfer member and is developed by application of ferromagnetic particles to the image. The developed image may then be transferred to a final support such as a copy sheet.

In any event, no matter what techniques may be utilized, after formation of the first and second unfixed images on the image transfer member, as depicted by box 112, both images are transferred to opposite sides respectively of a final support, such as a copy sheet, before fixing of either image to the support. Image transfer techniques are well known in the art and will be described later in greater detail with respect to electrophotographic apparatus of which the present invention may form a part.

Figure 2:
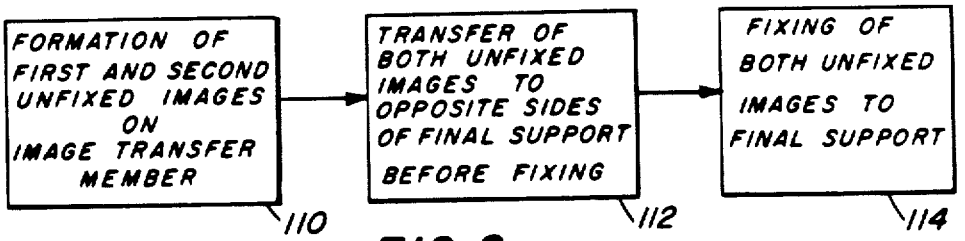

FIG. 2 illustrates a modification of the invention of FIG. 1, wherein box 114 depicts fixing of unfixed images to the final support after the images have been transferred from the transfer member to the support. As will be described later in greater detail, where the unfixed images comprise fusible electroscopic particles, fixing of the images to the final support may be effected by means of a pair of heated fuser rolls, by means of a pair of radiant heaters or by means of other known fusing techniques.

Figure 3:
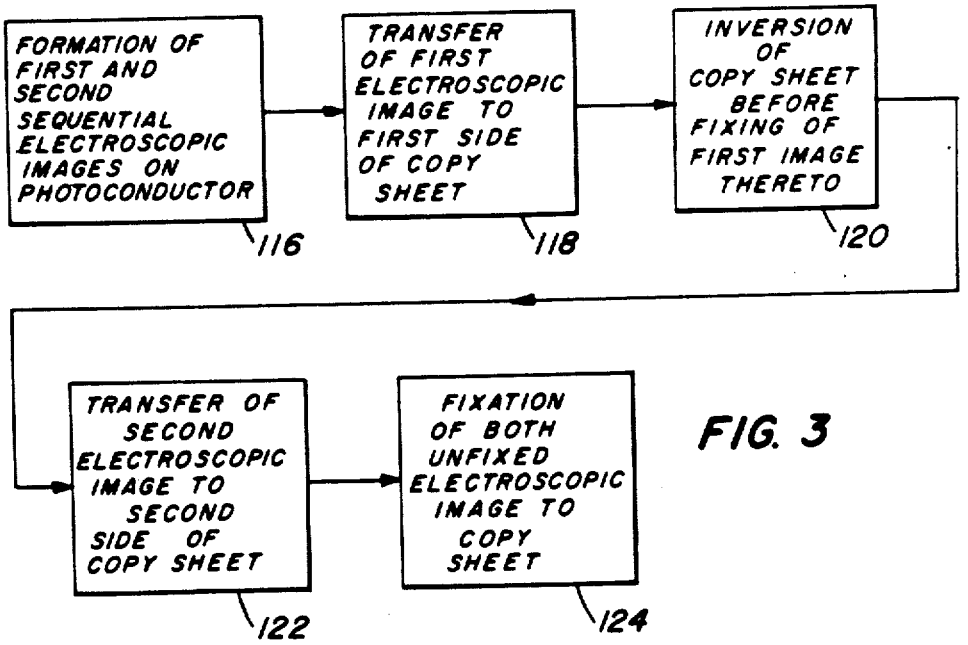

FIG. 3 is a block diagram of an embodiment of the invention of FIG. 1 utilizing electrophotographic techniques. Box 116 depicts the formation of first and second sequential unfixed electroscopic images on a photoconductor. Several techniques for forming such images have been described above and a specific technique will be described later with respect to the apparatus depicted in FIGS. 4 and 5.

As depicted by box 118, the first unfixed electroscopic image is transferred to a first side of a copy sheet brought into contact with the photoconductor at a first image transfer station. Thereafter, the copy sheet is separated from the photoconductor and the copy sheet is inverted before fixing of the first electroscopic image to the copy sheet so as to orient the second side of the copy sheet for image transfer contact with the photoconductor (box 120). The second unfixed electroscopic image is then transferred to the second side of the copy sheet at a second transfer station (box 122) and the copy sheet having unfixed electroscopic images on both sides thereof transported away from the photoconductor to an image fixing station (box 124) at which both images are fixed to the copy sheet.

Figure 4:
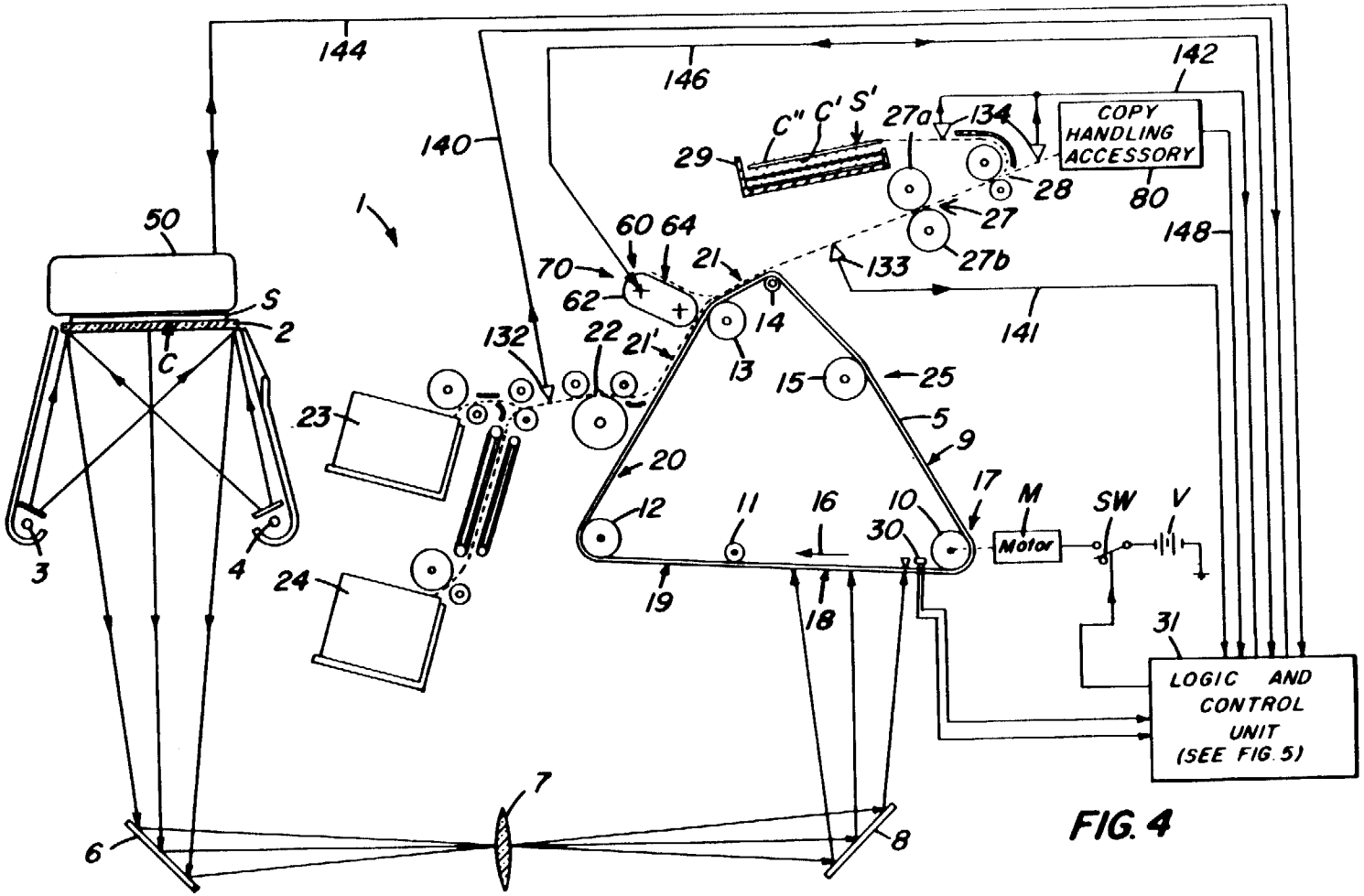
FIG. 4 is a schematic diagram of electrophotographic apparatus illustrating the embodiment of FIG. 3.
Figure 5:
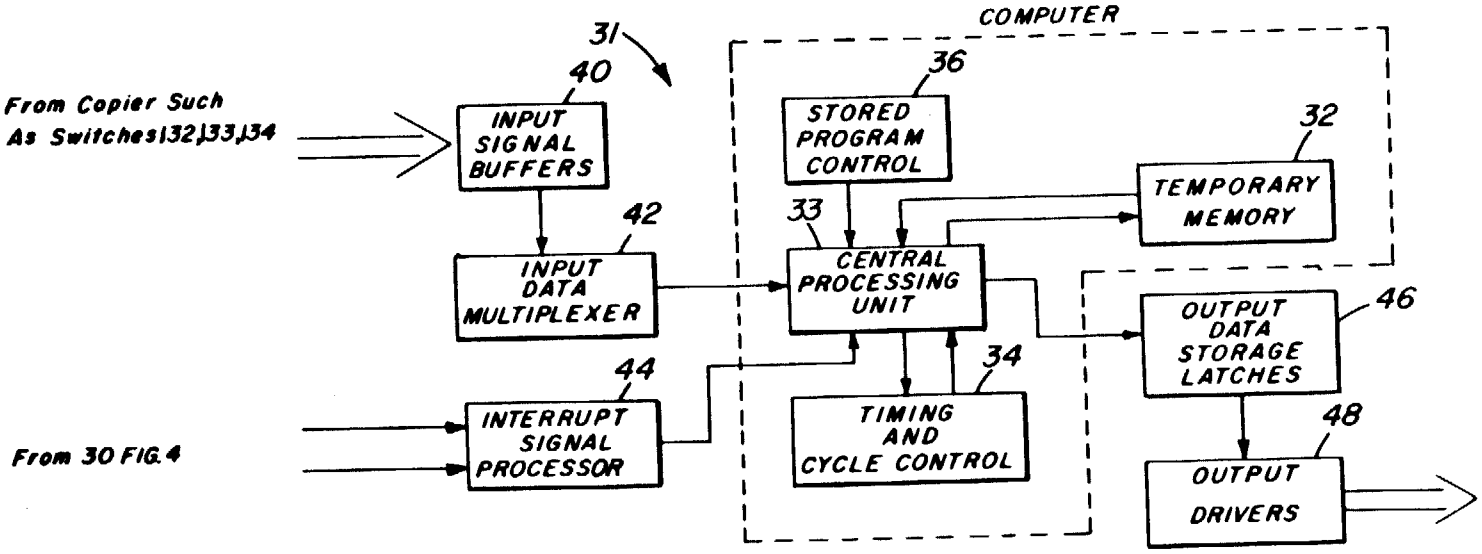
FIG. 5 is a block diagram of the logic and control unit of FIG. 4.

Electrophotographic Copier and Logic and Control Unit (FIGS. 4 & 5)

Referring now to FIGS. 4 and 5 there is schematically illustrated electrophotographic apparatus 1 (referred to herein as a copier) including a duplex copy station according to the present invention. Only those features of the copier which are helpful for a full understanding of the preferred embodiment are described hereinafter. However, more complete description of the copier may be found in commonly assigned U.S. Pat. No. 3,914,047, patented: Oct. 21, 1975, in the names of Hunt et al.

A recirculating feeder 50 is positioned on top of exposure platen 2. The recirculating feeder may take the form of that disclosed in U.S. Pat. No. Re27,976 or U.S. patent application Ser. No. 523,610 filed on Nov. 13, 1974 wherein a plurality of sheets of a document having images only on first sides of the sheets can be repeatedly fed in succession from an originating stack to the exposure platen 2 of copier 1. Recirculating feeder 50 may also take the form of that disclosed in U.S. patent application Ser. Nos. 691,937 and 691,638, filed June 1, 1976 or in U.S. patent application Ser. No. 768,666 filed Feb. 14, 1977, entitled APPARATUS FOR PRODUCING COLLATED COPIES IN PAGE SEQUENTIAL ORDER, wherein a document having sheets with images on both sides thereof are repeatedly fed in order to the exposure platen with alternate sides of each sheet being presented to the exposure platen.

In either case, the feeder 50 places a selected side C of a sheet of an original document S with the selected side C facing an exposure platen 2 of the copier 1. The platen 2 is constructed of transparent glass. When energized, two xenon flash lamps 3 and 4 illuminate the selected side C of the original sheets S. By means of an object mirror 6, a lens 7, and an image mirror 8, a light image of the selected side C is reflected back from the exposure platen 2 and projected as an inverse or mirror image onto a discrete section of a photoconductive web 5. The photoconductive web 5 has a photoconductive or image receiving surface 9 and a tansparent support backing and is trained about six transport rollers 10, 11, 12, 13, 14 and 15 as an endless or continuous belt. Roller 10 is coupled to a drive motor M in a conventional manner. Motor M is connected to a source of potential V when a switch SW is closed by a logic and control unit (LCU) 31. When the switch SW is closed, the roller 10 is driven by the motor M and moves the web 5 in a clockwise direction indicated by arrow 16. This movement causes successive sections of the web 5 to sequentially pass a series of electrophotographic work stations.

For the purpose of the instant disclosure, the several work stations along the web's path of movement may be described as follows:

A charging station 17 at which the photoconductive surface 9 of the web 5 is sensitized by receiving a uniform electrostatic charge;

an exposing station 18 at which the inverse image of the selected side C of the original sheet S is projected onto the photoconductive surface 9 of the web 5; the image dissipates the electrostatic charge at the exposed areas of the photoconductive surface and forms a latent electrostatic image thereon which corresponds to the indicia on the selected side C of the original sheet S;

a developing station 19 at which developing powder, including electroscopic toner particles having an electrostatic charge opposite to that of the latent electrostatic image, is brushed over the photoconductive surface 9 of the web 5 and causes the toner particles to adhere to the latent electrostatic image to visibly form a toner particle or electroscopic image which is a mirror resemblance of the indicia on the selected side C of the original sheet S.

a post development erase station 20 at which the web is illuminated to reduce photoconductor fatigue, i.e., its inability to accept or hold an electrostatic charge;

copy duplex station 70 (to be described in greater detail later) at which first and second unfixed electroscopic images are electrostatically transferred from web 5 to opposite sides of a copy sheet S' before either image is fixed to sheet S'; and a cleaning station 25 at which the photoconductive surface 9 of the web 5 is cleaned of any residual toner particles remaining thereon after the electroscopic images have been transferred and is discharged of any residual electrostatic charge remaining thereon.

The details and operation of such a copier is shown in greater detail in U.S. Pat. No. 3,914,047, the contents of which is hereby incorporated by reference.

For the purposes of the present invention, first and second sequential unfixed electroscopic images are formed on web 5 in accordance with the above described sequence of operations of electrophotographic apparatus 1.

Copy duplex station 70 includes a first image transfer station 21', a copy sheet inverter on turn around device 60 and a second image transfer station 21. Final supports or copy sheets S' are supported in supply bins 23 and 24. A copy sheet S' is transported from either of bins 23 or 24 to a sheet registration device 22 where movement of sheet S' is checked to assure its arrival at first image transfer station 21' in registration with the arrival of the first unfixed electroscopic image at station 21'.

At transfer station 21', the first electroscopic image on web 5 is transferred to the first side C' of sheet S' by electrostatic means. Copy sheet inverter 60 is shown as an endless vacuum belt 62 which is in vacuum contact with the unimaged side of sheet S' as it separates from web 5 due to known detacking techniques and to the change in direction of belt 5 as it passes over roller 13. Vacuum belt 62 is reversible and is run in a counterclockwise direction (as shown in FIG. 4) in order to completely separate sheet S' from web 5 after transfer of the first unfixed electroscopic image thereto at transfer station 21'.

After belt 62 has transported sheet S' along sheet inversion path 64, the direction of belt 62 is reversed, so as to transport the second unimaged side C'' of sheet S' into transfer contact with web 5 at second transfer station 21 in registration with the second unfixed electroscopic image on web 5. In separating sheet S' from and in returning it into contact with web 5, belt 62 is driven at appropriate speeds to match the speed of belt 5 and the distance on belt 5 between the first and second unfixed electroscopic images to be transferred to sheet S'. Normally, the distance between the first and second images on belt 5 may be kept to a minimum due to the relative location of sheet inverter 60 with respect to transfer stations 21' and 21. In addition, the distance between images may be kept small by any of various means to move the edge of S' (the trailing edge of the first image, or leading edge of the second image) to move in a path which closely follows the path of belt 5. Such means can include mechanical, pneumatic, or electrostatic devices which deflect the edge of S' while it is free of belt 5 and while the belt 62 is reversing, thus positioning S' for reengagement with belt 5 and reducing the amount of motion of belt 62.

It should be noted that during inversion of copy sheet S', the first unfixed electroscopic image transferred to the first side thereof remains unfixed and is not disturbed during inversion since vacuum belt 62 only comes into contact with the unimaged second side of sheet S'. Thus, no fuser is required to fix the first electroscopic image to copy sheet S' before inversion of the copy sheet and before transfer of the second electroscopic image thereto.

After transfer of both unfixed electroscopic images to copy sheet S', it is transported to fuser 27 including opposed rolls 27a and 27b. Where the electroscopic particles forming the images on sheet S' are heat fusible, rolls 27a and 27b are both heated to heat fuse both unfixed electroscopic images to the opposite sides of sheet S' respectively. Where the electroscopic particles are pressure fusible, rolls 27a, 27b need not be heated and fixing to sheet S' is effected through pressure alone.

Duplex copy sheet S' may be transported to an output tray 29 or to a copy handling accessory 80 such as a finisher where the sheets may be stacked in a straight or offset manner or where groups of copy sheets corresponding to the sheets of the original may be stapled into booklets. Commonly assigned U.S. patent application Ser. Nos. 671,841 and 671,753, filed Mar. 30, 1976 disclose a finisher which may be used to effect offset stacking and stapling.

To coordinate operation of the various work stations 17, 18, 19, 60 and 25 with movement of the image areas on the web 5 past these stations, the web has a plurality of perforations, not shown, along one of its edges. At a fixed location along the path of web movement, there is provided suitable means 30 for sensing web perforations. This sensing generates input signals into a LCU 31 having a digital computer. The digital computer has a stored program responsive to the input signals for sequentially actuating then de-actuating the work stations as well as for controlling the operation of many other machine functions as disclosed in U.S. Pat. No. 3,914,047. Preferably, feeder 50 and copy handling accessory 80 are also controlled by LCU 31.

Logic and Control Unit 31

Programming of a number of commercially available minicomputers or microprocessors, such as an INTEL model 8008 or model 8080 microprocessor (which along with others can be used in accordance with the invention), is a conventional skill well understood in the art. The following disclosure is written to enable a programmer having ordinary skill in the art to produce an appropriate program for the computer. The particular details of any such program would, of course, depend upon the architecture of the selected computer.

Turning now to FIG. 5, a block diagram of a typical logic and control unit (LCU) 31 is shown which interfaces with the copier 1 and the feeder 50. The LCU 31 consists of temporary data storage memory 32, central processing unit 33, timing and cycle control unit 34, and stored program control 36. Data input and output is performed sequentially under program control. Input data is applied either through input signal buffer 40 to a multiplexer 42 or to signal processor 44 from perforations detected on the web 5. The input signals are derived from various switches, sensors, and analog-to-digital converters. The output data and control signals are applied to storage latches 46 which provide inputs to suitable output drivers 48 which are directly coupled to leads which, in turn, are connected to the work stations. More specifically, the output signals from the LCU 31 are logic level digital signals which are buffered and amplified to provide drive signals to various clutches, brakes, solenoids, power switches, and numeric displays in the various copier work stations and feeder 50 of copier 1. The LCU 31 processing functions can be programmed by changing the instructions stored in the computer memory.

The time sequence of machine control signals (often referred to in the art as events) is critical to the copy cycle because the copier and feeder stations and associated mechanisms must be powered ON and OFF in the correct sequence to assure high quality copying and to prevent paper misfeeds, misregistration, and erratic operation. One way of controlling the time sequence of events and their relationship to each other is, as noted above, to sense perforations which correspond to the location of the image elements on the web 5 as these elements continue through the cycle of the copier's endless path. Thus, the detection of perforations by a sensor 30 is applied to the LCU 31 through the interrupt signal processor 44 (see FIG. 5) and is used to synchronize the various control mechanisms with the location of the image elements. These perforations generally are spaced equidistant along the edge of the web member 16. For example, the web member 5 may be divided into six image areas by F perforations; and each image area may be subdivided into 51 sections by C perforations. These F and C perforations (not shown) are described in U.S. Pat. No. 3,914,047.

Returning now to the computer, the program is located in stored program control 36 which may be provided by a conventional Read Only Memory (ROM). The ROM contains the operational program in the form of instructions and fixed binary numbers corresponding to numeric constants. These programs are permanently stored in the ROM(s) and cannot be altered by the computer operation.

Typically, the ROM is programmed at the manufacturer's facility, and the instructions programmed provide the required control functions such as: sequential control, jam recovery, operator observable logic, machine timing, automatic document rearrangement and copy sheet duplexing. For a specific example, the total ROM capacity may be approximately 2,000 bytes with each byte being 8 bits in length. The program may require more than one ROM.

The temporary storage memory 32 may be conveniently provided by a conventional Read/Write Memory. Read/Write Memory or Random Access Memory (RAM) differs from ROM in two distinct characteristics:

1. Stored data is destroyed by removal of power; and
2. The stored data is easily altered by writing new data into memory.

For specific example, the RAM capacity may be 256 bytes; each byte being 8 bits in length. Data, such as: copy requested count, copies processed count, and copies delivered count, at the exit as indicated by the switch 34, are stored in the RAM until successful completion of a copy cycle. The RAM is also used to store data being operated on by the computer and to store the results of computer calculations.

Sensors 132, 133 and 134 spaced along the copy sheet path provide inputs along leads 140, 141 and 142 respectively to LCU 31 to indicate copy sheet jam conditions which may necessitate shutdown of copier 1 in order to prevent damage to the various components thereof.

Leads 144 and 146 from feeder 50 and copy sheet inverter 60, respectively, provide inputs to and receive outputs from LCU 31 to synchronize the operation of these devices to produce duplex copy sheets by copier 1. Lead 148 from accessory 80 also provides inputs and receives outputs from LCU 31 to synchronize the operation thereof with the operation of copier 1.

The invention has been described in detail with particular reference to preferred embodiments thereof, but it will be understood that variations and modifications can be effected within the spirit and scope of the invention.

What is claimed is:

[1. A method of producing first and second images on opposite sides respectively of a support comprising:
- forming first and second transferable unfixed images on an image transfer member; and
- transferring said first and second transferable unfixed images from said image transfer member to opposite sides respectively of a support before fixing of either of said unfixed images to said support.]

[2. The method of claim 1 including fixing said first and second images to said opposite sides of said support after transfer of both images to said support.]

[3. A method of producing duplex images on opposite sides of a copy sheet comprising:
- forming first and second transferable unfixed images on first and second areas of an image transfer member;
- transferring said first unfixed image from said transfer member to one side of a copy sheet; and
- transferring said second unfixed image from said transfer member to the other side of the copy sheet before fixing of said first image to said sheet.]

[4. The method of claim 3 including simultaneous fixing of said first and second images to said copy sheet.]

[5. The method of claim 3 including inverting said copy sheet after transfer of said first unfixed image to said one side of said copy sheet but before transfer of said second unfixed image to said other side of said copy sheet and while said first image is unfixed on said copy sheet.]

[6. A method of forming images on first and second sides of a copy sheet comprising of steps of:
- forming first and second sequential unfixed images on a photoconductor;
- transferring said first unfixed image from said photoconductor to a first side of a copy sheet having first and second opposite sides;
- transferring said second unfixed image from said photoconductor to the second side of said copy sheet before fixing of said first image to said copy sheet; and
- transporting the copy sheet having said first and second unfixed images away from said photoconductor to a fixing station.]

[7. The method of claim 6 including the step of inverting said copy sheet after transfer of said first unfixed image to the first side thereof but before fixing of said first image to said first side so as to present the second side of said copy sheet for transfer of said second unfixed image on said photoconductor to said copy sheet second side.]

[8. The method of claim 6 including the step of fixing the first and second unfixed images on said copy sheet.]

[9. The method of claim 7 wherein said step of inverting includes contacting the second side of said copy sheet during copy sheet inversion so as not to disturb the first unfixed image on said first side of said copy sheet during sheet inversion.]

[10. A method of forming unfixed electroscopic images on first and second sides of a copy sheet before fixing of either image to said copy sheet comprising the steps of:
- forming first and second sequential electroscopic images on an endless photoconductive member;
- transferring said first electroscopic image from said photoconductive member to the first side of a copy sheet having first and second opposite sides;
- inverting the copy sheet having said first unfixed electroscopic image on the first side thereof so as to present the second side thereof for transfer of the second electroscopic image on said photoconductive member to the second side of said copy sheet;
- transferring the second electroscopic image from said photoconductive member to the second side of said copy sheet; and
- transporting said copy sheet with said first and second unfixed images thereon to an image fixing station.]

[11. The method of claim 10 wherein said forming step comprises:
- forming first and second electrostatic images on said photoconductive member; and
- developing said first and second electrostatic images with electroscopic particles to form first and second visual unfixed images on said photoconductive member.]

*12. A method of forming images on the opposite sides of a copy sheet, comprising:*
- *moving an image transfer member along an endless path having first and second spaced image transfer stations;*
- *forming first and second sequential adjacent transferable unfixed images on said image transfer member;*

*feeding a copy sheet into transfer relationship with said image transfer member at said first image transfer station and transferring said first unfixed image to one side of said copy sheet;*

*while contacting the unimaged other side of said copy sheet without contacting said one side carrying said first unfixed image, separating said copy sheet from said image transfer member and refeeding said sheet into transfer relationship with said image transfer member at said second image transfer station; and*

*transferring said second unfixed image to the other side of said copy sheet while said first image is unfixed.*

*13. The method of claim 12 including fixing said first and second images to said copy sheet after transfer of said second unfixed image to said sheet.*

*14. An electrographic method of forming images on the opposite sides of a copy sheet, comprising:*

*moving a photoconductive member along an endless path having first and second spaced image transfer stations;*

*forming first and second sequential adjacent unfixed toner images on said photoconductive member;*

*feeding a copy sheet into transfer relationship with said photoconductive member at said first image transfer station and transferring said first unfixed toner image to one side of said copy sheet;*

*while contacting the unimaged other side of said copy sheet without contacting said one side carrying said first unfixed toner image, separating said copy sheet from said photoconductive member and refeeding said copy sheet into transfer relationship with said photoconductive member at said second image transfer station; and*

*transferring said second toner image to the other side of said copy sheet while said first toner image is unfixed.*

*15. The method of claim 14 including fixing said first and second images to said copy sheet after transfer of said second toner image to said copy sheet.*

*16. The method of claim 14 wherein said forming of toner images includes forming first and second sequential adjacent electrostatic images on said photoconductive member; and*

*developing said first and second electrostatic images with toner particles to form first and second unfixed toner images on said photoconductive member.*

*17. The method of claim 14 wherein said separating of said copy sheet includes inverting said copy sheet after separation by contacting the unimaged other side of said sheet without contacting the one side carrying the unfixed toner image.*

*18. The method of claim 14 wherein said feeding of said copy sheet includes supplying a plurality of copy sheets in a supply and feeding copy sheets seriatim from said supply to said first transfer station.*

*19. The method of claim 14 wherein said separating said copy sheet includes vacuum contacting the unimaged other side of said copy sheet without contacting said one side carrying said first unfixed toner image.*

*20. A method of producing first and second images on opposite sides respectively of a support comprising:*

*forming first and second transferable unfixed images on an image transfer member; and*

*transferring said first and second transferable unfixed images from said image transfer member to opposite sides respectively of a support before fixing of either of said unfixed images to said support by moving one side of a support into transfer relationship with said image transfer member for transfer of said first image and without contacting said one side with said first image, moving said support away from and back into transfer relationship with said image transfer member for transfer of said second image to the other side of said support.*

*21. The method of claim 20 including fixing said first and second images to said opposite sides of said support after transfer of both images to said support.*

*22. A method of producing duplex images on opposite sides of a copy sheet comprising:*

*forming first and second transferable unfixed images on first and second areas of an image transfer member;*

*transferring said first unfixed image from said transfer member to one side of a copy sheet;*

*without contacting said one side carrying said first unfixed image, moving said sheet away from and back into transfer relationship with said image transfer member; and*

*transferring said second unfixed image from said transfer member to the other side of the copy sheet before fixing of said first image to said sheet.*

*23. The method of claim 22 including simultaneous fixing of said first and second images to said copy sheet.*

*24. The method of claim 22 including inverting said copy sheet after transfer of said first unfixed image to said one side of said copy sheet while said first image is unfixed but before transfer of said second unfixed image to said other side of said copy sheet.*

*25. A method of forming images on first and second sides of a copy sheet comprising the steps of:*

*forming first and second sequential unfixed images on a photoconductor;*

*transferring said first unfixed image from said photoconductor to a first side of a copy sheet having first and second opposite sides;*

*without contacting said first side carrying said first unfixed image, moving said copy sheet away from and back into transfer relationship with said photoconductor;*

*transferring said second unfixed image from said photoconductor to the second side of said copy sheet before fixing of said first image to said copy sheet; and*

*transporting the copy sheet having said first and second unfixed images away from said photoconductor to a fixing station.*

*26. The method of claim 25 including the step of inverting said copy sheet after transfer of said first unfixed image to the first side thereof but before fixing of said first image to said first side so as to present the second side of said copy sheet for transfer of said second unfixed image on said photoconductor to said copy sheet second side.*

*27. The method of claim 25 including the step of fixing the first and second unfixed images on said copy sheet.*

*28. The method of claim 26 wherein said step of inverting includes contacting the second side of said copy sheet during copy sheet inversion without contacting said first side so as not to contact the first unfixed image on said first side of said copy sheet during sheet inversion and before transfer of said second unfixed image to said copy sheet.*

*29. A method of forming unfixed electroscopic images on first and second sides of a copy sheet before fixing of either image to said copy sheet comprising the steps of:*

*forming first and second sequential electroscopic images on an endless photoconductive member;*

*transferring said first electroscopic image from said photoconductive member to the first of a copy sheet having first and second opposite sides;*

*without contacting said first side, inverting the copy sheet having said first unfixed electroscopic image on the first side thereof so as to present the second side thereof for transfer of the second electroscopic image on said photoconductive member to the second side of said copy sheet;*

*transferring the second electroscopic image from said photoconductive member to the second side of said copy sheet; and*

*transporting said copy sheet with said first and second unfixed images thereon to an image fixing station.*

*30. The method of claim 29 wherein said forming step comprises:*

*forming first and second electrostatic images on said photoconductive member; and*

*developing said first and second electrostatic images with electroscopic particles to form first and second visual unfixed images on said photoconductive member.*

*31. A method of forming images on first and second sides of a copy sheet comprising the steps of:*

*forming first and second sequential unfixed images on a photoconductor;*

*transferring said first unfixed image from said photoconductor to a first side of a copy sheet having first and second opposite sides;*

*inverting said copy sheet after transfer of said first unfixed image to the first side thereof but before fixing of said first image to said first side so as to present the second side of said copy sheet for transfer of said second unfixed image on said photoconductor to said copy sheet's second side, said copy sheet inversion being effected by contacting the second side of said copy sheet during copy sheet inversion without contacting said first side so as not to contact the first unfixed image on said first side of said copy sheet during sheet inversion and before transfer of said second unfixed image to said copy sheet;*

*transferring said second unfixed image from said photoconductor to the second side of said copy sheet before fixing of said first image to said copy sheet; and*

*transporting the copy sheet having said first and second unfixed images away from said photoconductor to a fixing station.*

* * * * *